(12) United States Patent
Pete et al.

(10) Patent No.: US 7,281,769 B2
(45) Date of Patent: Oct. 16, 2007

(54) TWO-COMPONENT WHEEL HUB

(75) Inventors: Reginal A. Pete, Caledonia, IL (US);
Omar J. Fakhoury, Rockford, IL (US);
Gary E. Tope, Byron, IL (US); Rabbi J. Farraj, Huntley, IL (US); Adam L. Purvis, Rockford, IL (US); Mark K. Bucey, Byron, IL (US)

(73) Assignee: Gunite Corporation, Rockford, IL (US)

( * ) Notice: Subject to any disclaimer, the term of this patent is extended or adjusted under 35 U.S.C. 154(b) by 148 days.

(21) Appl. No.: 10/735,236

(22) Filed: Dec. 12, 2003

(65) Prior Publication Data

US 2006/0012242 A1    Jan. 19, 2006

(51) Int. Cl.
*B60B 27/00*    (2006.01)
*B60T 1/06*    (2006.01)

(52) U.S. Cl. .................. 301/105.1; 301/6.8; 188/18 A
(58) Field of Classification Search ............. 301/105.1, 301/124.1, 110.5, 111.01, 106, 108.5, 6.1, 301/6.8, 36.1; 384/544; 180/254; 464/178; 188/18 R, 218 R, 118 A, 264 A, 17, 18 A
See application file for complete search history.

(56) References Cited

U.S. PATENT DOCUMENTS

| 2,095,054 | A | * | 10/1937 | Burger | 301/6.1 |
| 2,251,538 | A | * | 8/1941 | Ash | 301/6.1 |
| 2,251,539 | A | * | 8/1941 | Ash | 188/18 A |
| 2,254,198 | A | * | 9/1941 | Ash | 301/5.1 |
| 2,343,129 | A | * | 2/1944 | Ash | 301/36.1 |
| 2,781,231 | A | * | 2/1957 | Black | 301/105.1 |
| 4,811,992 | A | * | 3/1989 | Steiner | 301/105.1 |
| 6,076,896 | A | * | 6/2000 | Bertetti et al. | 301/105.1 |
| 6,095,617 | A | * | 8/2000 | Bertetti | 301/6.8 |
| 6,224,266 | B1 | * | 5/2001 | Ohtsuki et al. | 384/571 |
| 6,446,765 | B1 | * | 9/2002 | Dabertrand et al. | 188/18 A |
| 2003/0111893 | A1 | * | 6/2003 | Hamperl | 301/105.1 |
| 2004/0207249 | A1 | * | 10/2004 | Baumgartner et al. | 301/105.1 |
| 2005/0173972 | A1 | * | 8/2005 | De Freitas | 301/105.1 |
| 2005/0236886 | A1 | * | 10/2005 | Hall et al. | 301/105.1 |

* cited by examiner

*Primary Examiner*—Russell D. Stormer
(74) *Attorney, Agent, or Firm*—Michael Best & Friedrich LLP

(57) ABSTRACT

A wheel hub having two separable components. The wheel hub includes a sleeve rotatably mounted to a vehicle axle. A wheel-mounting flange for mounting a wheel of the vehicle is positioned substantially around the sleeve, and a bolting lip of a brake rotor (or brake drum) is sandwiched between the wheel-mounting flange and a bolting flange of the sleeve.

16 Claims, 5 Drawing Sheets

TWO-COMPONENT WHEEL HUB

BACKGROUND AND SUMMARY OF THE INVENTION

The present invention relates to motor vehicles and more particularly to a wheel hub that couples a wheel to an axle of a motor vehicle.

Conventional wheel hubs typically include a sleeve mounted for rotation around an axle. The sleeve has bearings and lubricant that provide the rotational coupling for the wheel to rotate about the axle, and the sleeve typically also includes an integrally-formed wheel-mounting flange that extends out from the outer surface of the sleeve. The wheel-mounting flange includes bolt holes through which bolts are inserted that mount the vehicle wheel to the wheel-mounting flange.

In conventional wheel hub arrangements, a mounting flange of a brake rotor (or brake drum) also typically include bolt holes for mounting the brake rotor or drum to the sleeve using the same bolts that are used for mounting the wheel to the wheel-mounting flange. In other words, the flange of the brake rotor is coupled to the wheel-mounting flange with the same bolts that are used to mount the wheel to the wheel-mounting flange. With this arrangement, the brake rotor is positioned "inboard" of the wheel-mounting flange, which means that the brake rotor is positioned on a side of the wheel-mounting flange away from the outside of the vehicle, or on the side of the wheel-mounting flange opposite the wheel. Because of this, when access to the brake rotor and braking components is desired, the entire wheel hub (i.e., the sleeve with its integral wheel-mounting flange) must be removed from the vehicle's axle. After the brake rotor or other components of the brake are serviced, the wheel hub must be reinstalled, which requires resetting the bearings and re-lubricating the connection. A wheel hub that allows access to the brake rotor (or brake drum) without requiring removal of the wheel hub from the vehicle's axle, would be welcomed by users of wheel hubs because it would save time and make servicing the rotor or drum easier.

According to the present invention, a wheel hub for a vehicle having an axle and a wheel comprises a sleeve and a wheel-mounting flange. The sleeve is rotatably mounted on the axle and has a sleeve bolting flange radially extending from its outer surface. The wheel-mounting flange removably substantially surrounds the sleeve and has a first set of mounting holes for bolting the wheel-mounting flange to the sleeve bolting flange and a second set of mounting holes for bolting the wheel to the wheel-mounting flange. The second set of mounting holes is radially more distant from the sleeve than the first set of mounting holes.

DETAILED DESCRIPTION

Figure 1:
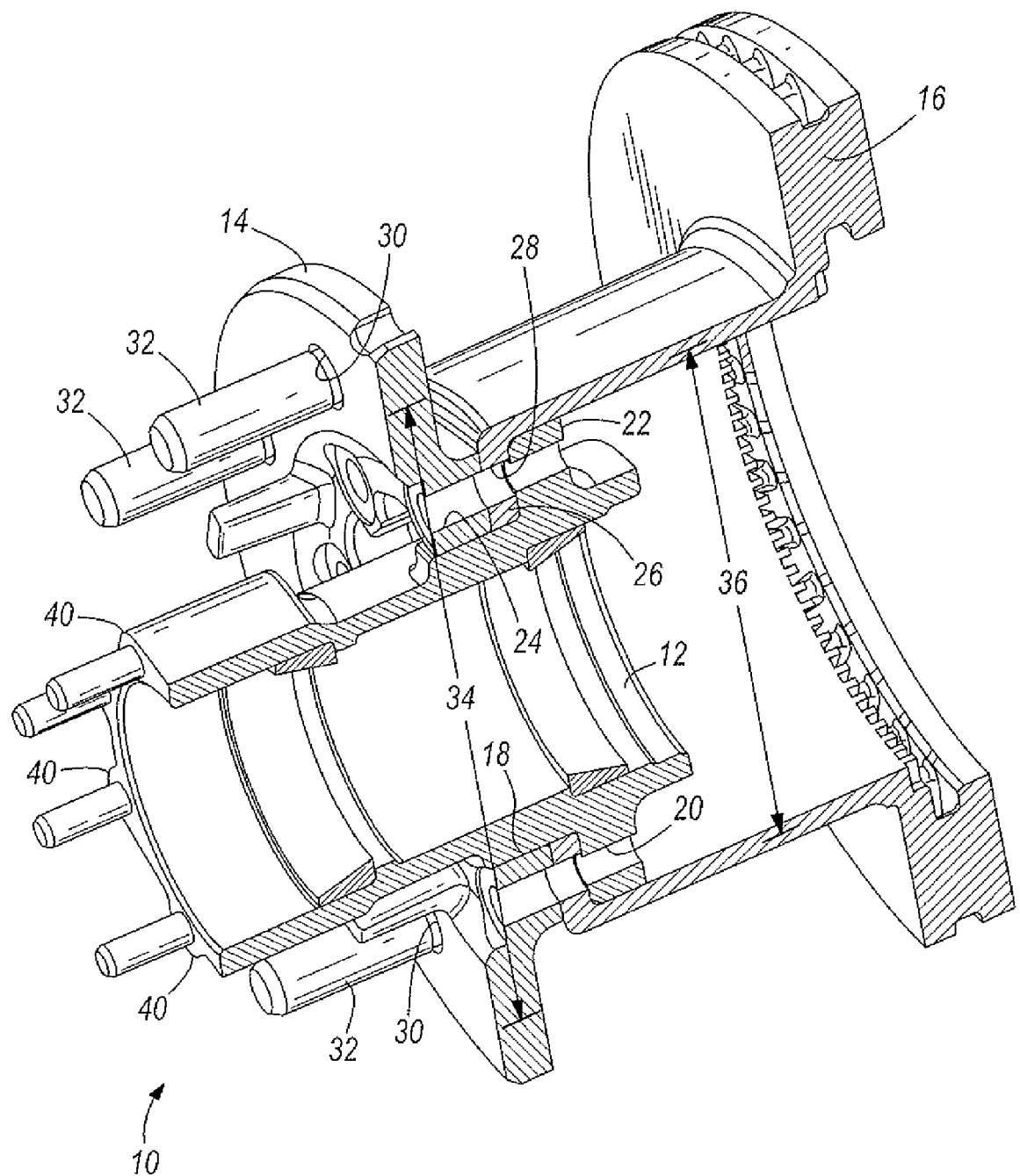
FIG. 1 is a cross-sectional perspective view of a brake rotor mounted to a wheel hub according to the present invention.

Referring to FIG. 1, a two-component wheel hub 10 according to the present invention includes a sleeve 12 and a separate wheel-mounting flange 14, both of which are coupled to a brake component. As will be readily apparent to those of ordinary skill in the art, the brake component is shown as a brake rotor 16 in the illustrated embodiment. However, the brake component could alternatively be a brake drum or other similar component of a braking system and still be within the spirit and scope of the present invention.

Figure 3:
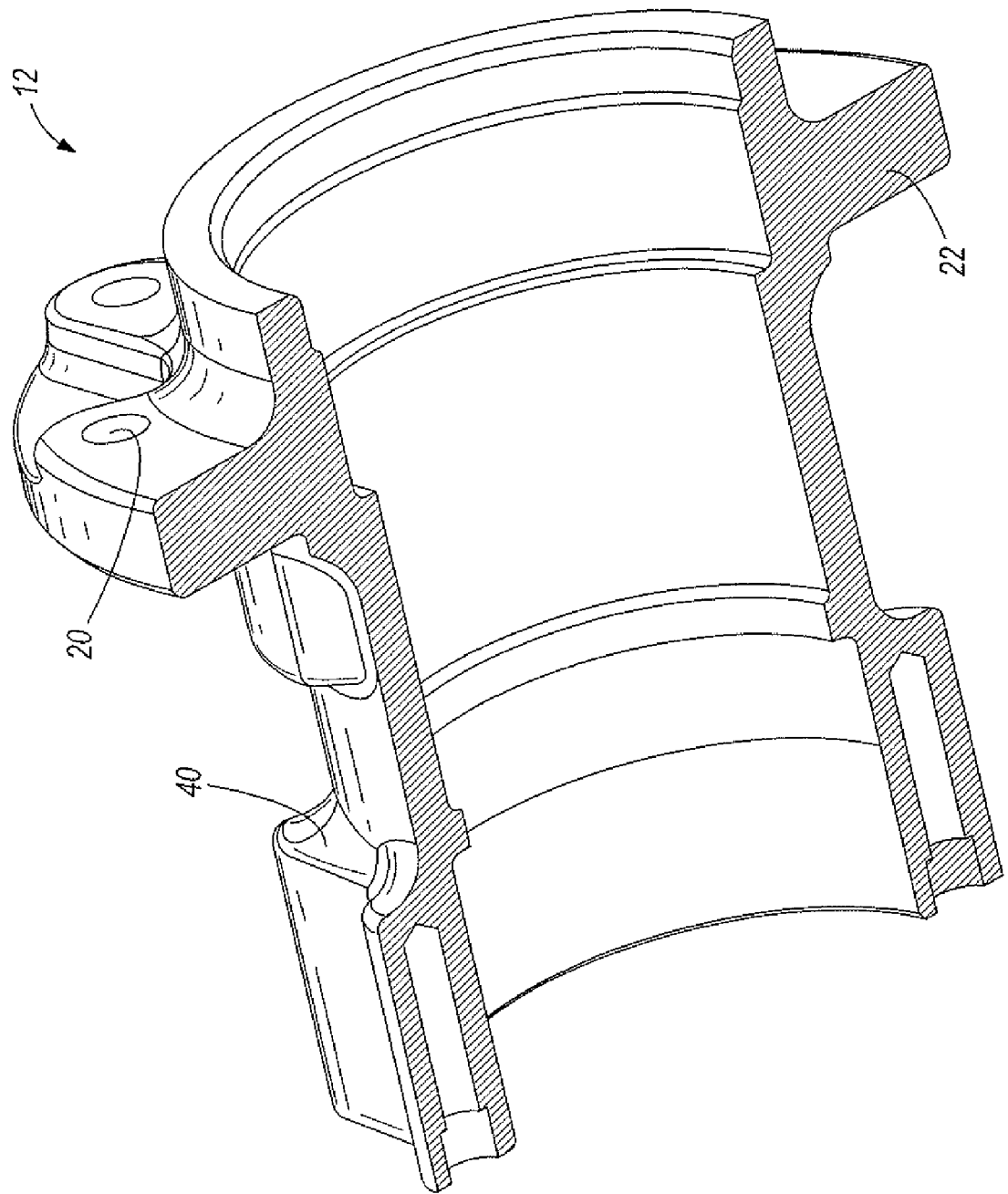
FIG. 3 is a cross-sectional perspective view of a sleeve of the wheel hub of FIG. 1.
Figure 4:
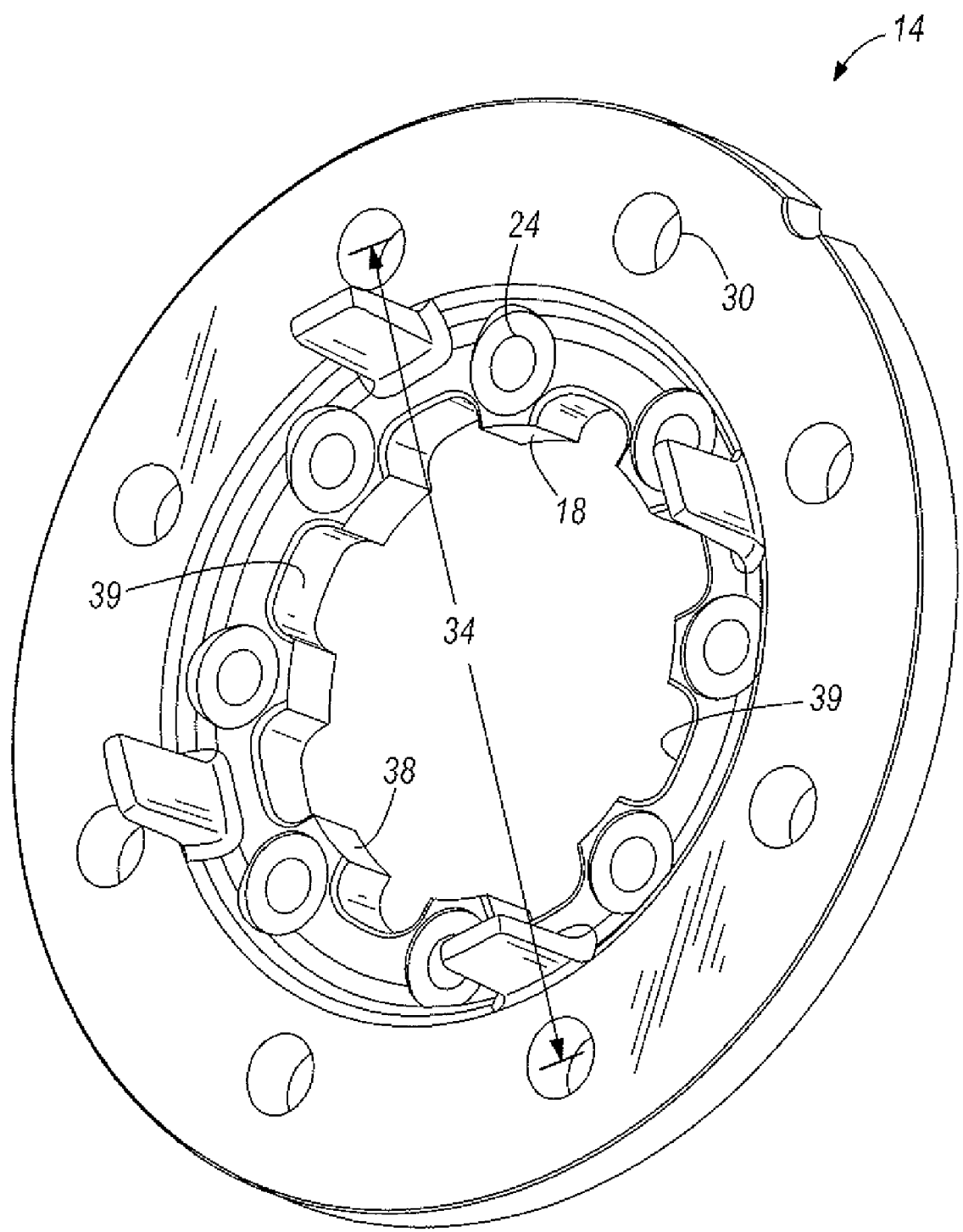
FIG. 4 is a perspective view of a wheel-mounting flange of the wheel hub of FIG. 1.
Figure 5:
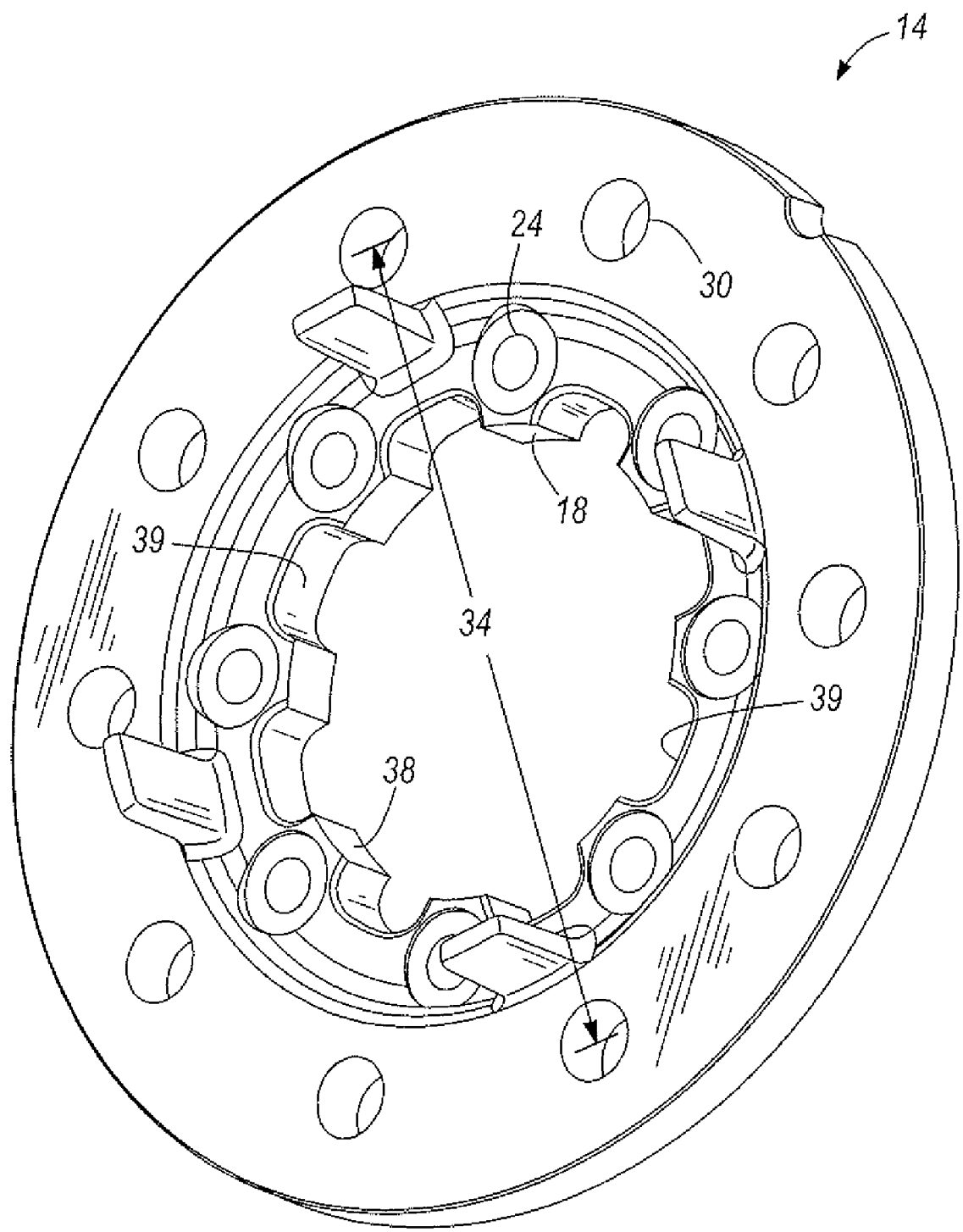
FIG. 5 is a perspective view of an alternative embodiment of a wheel-mounting flange of the wheel hub of FIG. 1.

The wheel-mounting flange 14 is formed separately from the sleeve 12 and includes a central opening 18 that receives the sleeve 12. As shown in FIGS. 3 and 4, central opening 18 has an inner edge 38 that is scalloped to define one or more cavities 39 so that flange 14 can pass over projections or bolting lugs 40 that project from the sleeve 12. The scalloped inner edge 38 of the central opening 18 is designed so that the wheel-mounting flange 14 can be rotationally positioned to receive or pass over the bolting lugs 40. A series of bolts (not shown) extend through bolt holes 20 of a sleeve bolting flange 22 extending radially from the sleeve 12. The bolts also extend through a first set of mounting holes 24 of the wheel-mounting flange 14 and couple the wheel-mounting flange 14 to the sleeve 12 and to the brake rotor 16, as discussed below.

Figure 2:
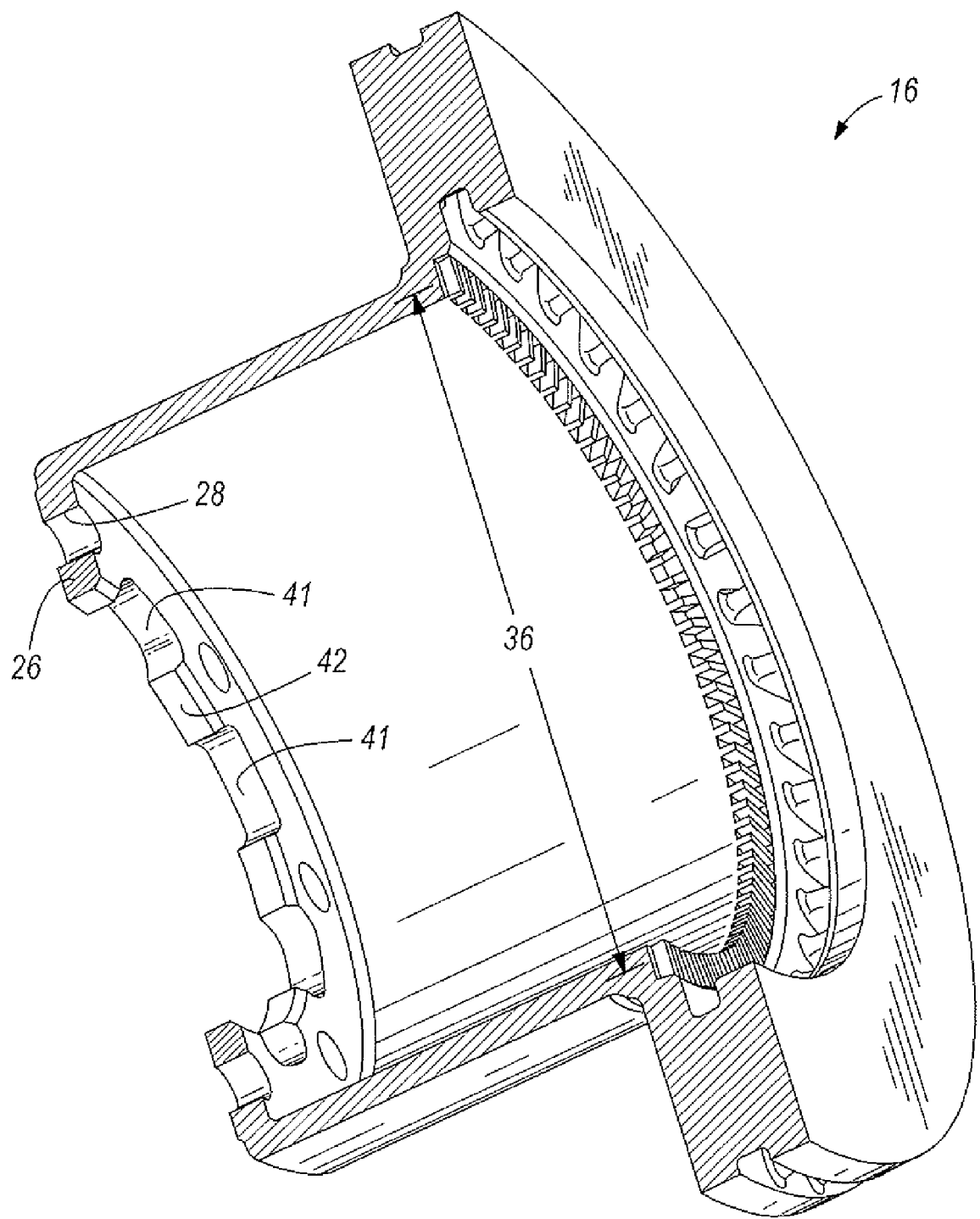
FIG. 2 is a cross-sectional perspective view of the brake rotor of FIG. 1.

The brake rotor 16 is formed to include a bolting lip 26, which also includes a plurality of bolt holes 28. The bolt holes 28 are aligned with the bolt holes of the sleeve 12 and with the first set of mounting holes 24 of the wheel-mounting flange 14 to sandwich the bolting lip 26 between the wheel-mounting flange 14 and the bolting flange 22. This securely couples the brake rotor 16 to the wheel hub 10. Like the wheel-mounting flange 14, the brake rotor 16 also includes a scalloped inner edge 42 providing one or more cavities 41 to allow the brake rotor 16 to pass over the bolting lugs 40, as shown in FIG. 2.

With the sleeve 12 rotationally coupled to the axle, the brake rotor 16 is installed by rotating it so that its scalloped inner edge 42 is aligned to pass over the bolting lugs 40. The brake rotor 16 is then moved axially along the sleeve 12 until the bolting lip 26 abuts the bolting flange 22 of the sleeve 12. Next, the wheel-mounting flange 14 is rotated so that its scalloped inner edge 38 is aligned to pass over the bolting lugs 40. The wheel-mounting flange 14 is then moved axially along the sleeve 12 until it abuts the bolting lip 26 of the brake rotor 16, thus sandwiching the bolting lip 26 between the wheel-mounting 14 and the bolting flange 22 of the sleeve 12.

In addition to the first set of mounting holes 24, the wheel-mounting flange 14 includes a second set of mounting holes 30 located radially outwardly from the first set of mounting holes 24. The second set of mounting holes 30 receive bolts 32 that are used to couple a wheel (not shown) to the wheel-mounting flange 14. In this way, a wheel is securely mounted to the wheel hub 10 and rotates with the sleeve 12, the wheel-mounting flange 14, and the brake rotor 16. The sleeve 12 will contain the lubricant and bearings necessary to provide the rotational coupling between the sleeve 12 and an axle (also not shown) positioned within the sleeve 12.

The invention provides several advantages. With reference to FIG. 1, it can be seen that a wheel (again, not shown) and the wheel-mounting flange 14 to which it is mounted, can be removed to permit easy access to the brake rotor 16 without removing the sleeve 12 from an axle. In this way, the brake rotor 16 and other components (not shown) of the vehicle's braking system can be accessed and serviced without removing the sleeve 12. Removal of the sleeve 12 requires re-packing the bearings and re-lubricating the joint when the sleeve 12 is later remounted on the axle.

At the same time, the present invention allows the brake rotor 16 to be mounted "inboard" of the wheel-mounting flange 14. Previously, with a brake rotor mounted inboard of a wheel-mounting flange, the entire hub, which, as mentioned, typically includes an integrally-formed wheel-mounting flange, would need to be removed from the axle to access the braking components.

In previous wheel-mounting systems, if it was desired to permit removal of a brake rotor without having to remove the wheel hub, the brake rotor would have been mounted "outboard" of the wheel-mounting flange of the wheel hub. When mounted outboard, the brake rotor had to have a diameter large enough to fit over the wheel-mounting flange. As shown in FIG. 1, the wheel hub 10 allows access to the brake rotor 16 by simply removing the wheel-mounting flange 14, even though the brake rotor 16 is "inboard" of the wheel-mounting flange 14.

Further, the second set of mounting holes 30, which receive the bolts 32, can be positioned at various radial locations over the wheel-mounting flange 14 without regard for the diameter of the brake rotor 16. As shown in FIG. 1, the second set of mounting holes 30 are positioned radially more distant from the sleeve 12 than the first set of mounting holes 24 which receive the bolts that couple the brake rotor 16 to the wheel hub 10. This arrangement allows different wheel-mounting flanges 14 having differently positioned mounting holes 30 to be used with the same brake rotor 16. The wheel-mounting flange 14 can be changed out with another wheel-mounting flange without removing the sleeve 12 from the axle. As can also be seen in FIG. 1, the wheel (not shown) that mounts to the wheel-mounting flange 14 can include a set of mounting holes arranged in a circle with a greater diameter 34 than a diameter 36 of the brake rotor 16. In this way, brake rotors or brake drums with relatively small diameters can be used with wheels that have mounting holes with relatively larger diameters. A brake rotor or brake drum with a relatively small diameter may be desired for cost, weight, or other reasons that will be apparent to those of ordinary skill in the art.

Although the invention has been described in detail with reference to certain described constructions, variations and modifications exist within the scope and spirit of the invention as described and defined in the following claims.

The invention claimed is:

1. A wheel hub for a vehicle having an axle and a wheel, the hub comprising:

a sleeve rotatably mounted on the axle, the sleeve having an outer surface and a sleeve bolting flange radially extending from the outer surface;

a first wheel-mounting flange removably mountable to the sleeve and substantially surrounding the sleeve when mounted to the sleeve, the first wheel-mounting flange having a first set of mounting holes for bolting the first wheel-mounting flange to the sleeve bolting flange and a second set of mounting holes for bolting a wheel to the first wheel-mounting flange, the second set of mounting holes having a first configuration and being radially more distant from the sleeve than the first set of mounting holes;

a second wheel-mounting flange removably mountable to the sleeve and substantially surrounding the sleeve when mounted to the sleeve, the first and second wheel mounting flanges being interchangeably mounted to the sleeve, the second wheel mounting flange having a first set of mounting holes for bolting the second wheel-mounting flange to the sleeve bolting flange and a second set of mounting holes for bolting a wheel to the second wheel-mounting flange, the second set of mounting holes having a second configuration different than the first configuration and being radially more distant from the sleeve than the first set of mounting holes; and wherein the sleeve includes a radially extending bolting lug and the first and second wheel-mounting flanges each include an inner edge defining a cavity large enough to receive the bolting lug.

2. The wheel hub of claim 1, wherein the sleeve bolting flange includes a set of bolt holes aligned with the first set of mounting holes.

3. The wheel hub of claim 2, wherein the wheel-mounting flange extends radially beyond the sleeve bolting flange.

4. The wheel hub of claim 1, wherein the wheel-mounting flange extends radially beyond the sleeve bolting flange.

5. The wheel hub of claim 1, wherein a brake component is positioned in part between the sleeve bolting flange and the wheel-mounting flange when the wheel mounting flange and the brake component are mounted to the sleeve bolting flange.

6. The wheel hub of claim 1, wherein each of the inner edges of the first and second wheel-mounting flanges include a plurality of cavities, each cavity being large enough to receive the bolting lug and pass over the bolting lug in a plurality of particular rotational positions.

7. The wheel hub of claim 6, wherein the bolting lug is one of a plurality of bolting lugs extending outwardly from the outer surface of the sleeve, the plurality of cavities of the first and second wheel-mounting flanges being large enough to receive the plurality of bolting lugs and pass over the plurality of bolting lugs at a plurality of particular rotational positions.

8. A wheel-mounting assembly for a vehicle having an axle and a wheel, the assembly comprising:

a sleeve rotatably mounted on the axle and having an outer surface, the sleeve including a sleeve bolting flange radially extending from the outer surface and a plurality of bolting lugs extending outwardly from the outer surface;

a wheel-mounting flange substantially surrounding the sleeve and removable from the sleeve, the wheel-mounting flange including an inner edge defining a plurality of flange cavities configured to receive the plurality of bolting lugs and pass over the plurality of bolting lugs at a plurality of particular rotational positions; and a brake component positioned in part between the sleeve bolting flange and the wheel-mounting flange, the brake component including an inner edge defining a plurality of brake cavities configured to receive the plurality of bolting lugs and pass over the plurality of bolting lugs at a plurality of particular rotational positions.

9. The wheel mounting assembly of claim 8, wherein the wheel-mounting flange has a first set of mounting holes for bolting the wheel-mounting flange to the sleeve bolting flange and a second set of mounting holes for bolting the wheel to the wheel-mounting flange, the second set of mounting holes being radially more distant from the sleeve than the first set of mounting holes.

10. The wheel-mounting assembly of claim 9, wherein the brake component includes a set of bolting holes. substantially aligned with the first set of mounting holes, and wherein the sleeve bolting flange includes a set of bolt holes aligned with the first set of mounting holes of the wheel-mounting flange and the set of bolting holes of the brake component.

11. The wheel-mounting assembly of claim 10, wherein the second set of mounting holes of the wheel-mounting flange define a first diameter and the brake component defines a second diameter that is less than the first diameter.

12. The wheel-mounting assembly of claim 9, wherein the second set of mounting holes of the wheel-mounting flange define a first diameter and the brake component defines a second diameter that is less than the first diameter.

13. The wheel hub of claim 8, wherein the entire inner edge of the wheel-mounting flange is inboard of the plurality of bolting lugs.

14. The wheel hub of claim 8, wherein the entire inner edges of the wheel-mounting flange and the brake component are inboard of the plurality of bolting lugs.

15. A wheel hub comprising:
 a sleeve mounted on an axle, the sleeve including an outer surface and a projection extending outwardly from the outer surface, the projection including an outboard-most surface; and
 a wheel-mounting flange substantial surrounding the sleeve and including an inner edge with a cavity large enough to receive the projection, pass over the projection, and completely pass by the outboard-most surface of the protection in a particular rotational position;

wherein the inner edge of the wheel-mounting flange includes a plurality of cavities, each cavity being large enough to receive the projection, pass over the projection, and completely pass by the outboard-most surface of the projection in a plurality of particular rotational positions;

wherein the protection is one of a plurality of projections extending outwardly from the outer surface of the sleeve, each of the plurality of projections having an outboard-most surface, the plurality of cavities being large enough to receive the plurality of projections, pass over the plurality of projections, and completely pass by the outboard-most surfaces of the plurality of projections at a plurality of particular rotational positions; and wherein the sleeve includes a sleeve bolting flange radially extending from the outer surface of the sleeve, and wherein the wheel-mounting flange includes a first set of mounting holes for bolting the wheel-mounting flange to the sleeve bolting flange and a second set of mounting holes for bolting a wheel to the wheel-mounting flange, the second set of mounting holes being radially more distant from the sleeve than the first set of mounting holes.

16. The wheel hub of claim 15, wherein the inner edge of the wheel-mounting flange is scalloped.

\* \* \* \* \*